No. 620,977. Patented Mar. 14, 1899.
C. SCHNEIDER.
FERTILIZER DISTRIBUTER.
(Application filed June 18, 1898.)
(No Model.)
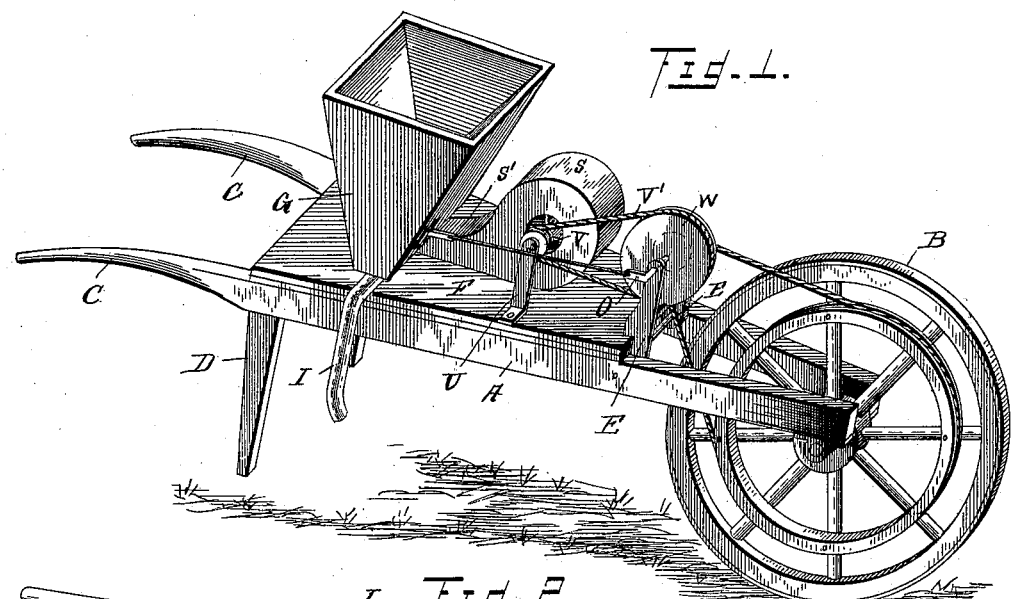
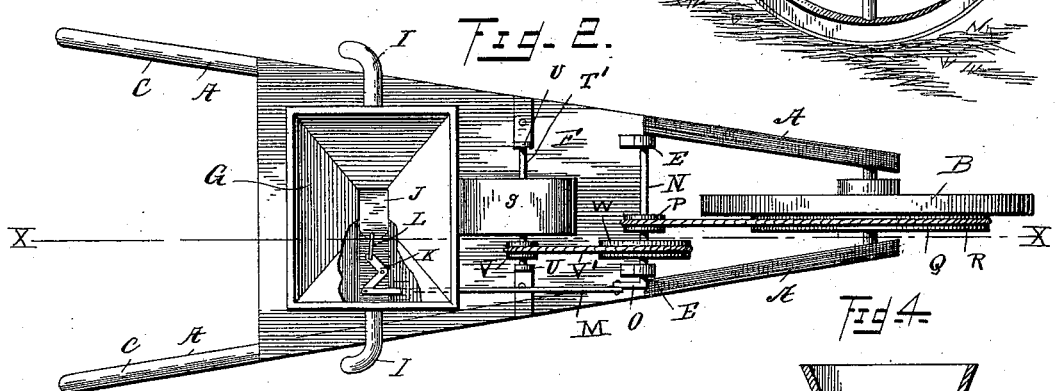
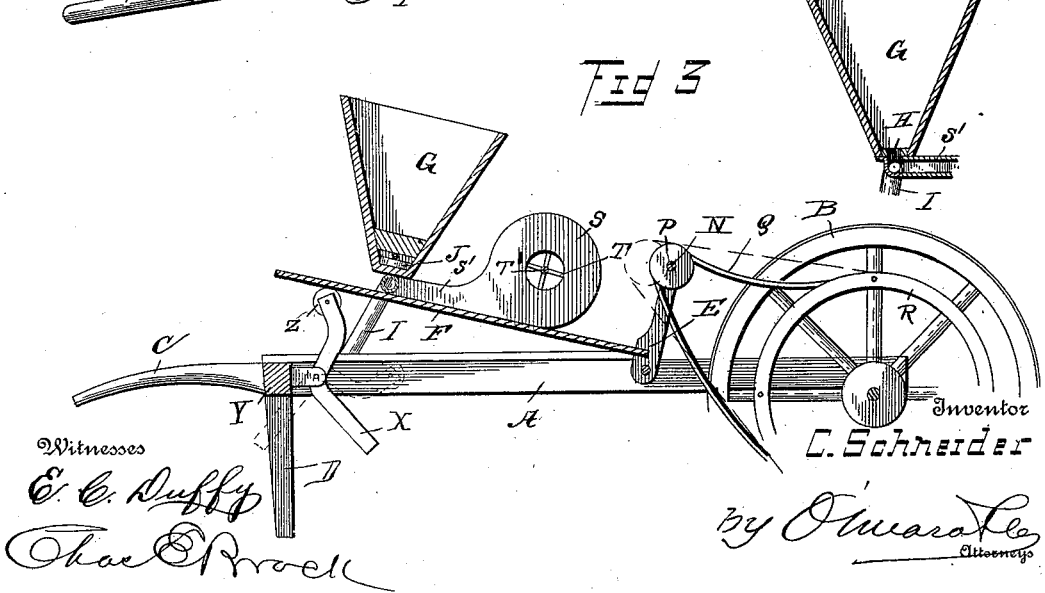
Witnesses
E. C. Duffy
Chas. E. Brock
Inventor
C. Schneider
by O'Meara Lee
Attorneys
THE NORRIS PETERS CO., PHOTO-LITHO., WASHINGTON, D. C.

UNITED STATES PATENT OFFICE.

CHARLES SCHNEIDER, OF UNION CITY, CONNECTICUT.

FERTILIZER-DISTRIBUTER.

SPECIFICATION forming part of Letters Patent No. 620,977, dated March 14, 1899.

Application filed June 18, 1898. Serial No. 683,829. (No model.)

*To all whom it may concern:*

Be it known that I, CHARLES SCHNEIDER, a citizen of the United States, residing at Union City, in the county of New Haven and State of Connecticut, have invented a new and useful Fertilizer-Distributer, of which the following is a specification.

The invention relates to improvements in fertilizer-distributers; and the object thereof is to provide a simple, light, and effective distributer which may be wheeled between the rows or furrows by the operator and distribute the fertilizer to the two adjacent rows simultaneously.

A further object is to provide a simple construction whereby the distributer mechanism may be quickly and readily thrown in or out of operation.

With the above objects in view the invention consists of a supporting-frame having a ground-wheel at one end thereof and handles at the opposite end, a base-board pivoted to said frame, a hopper mounted upon said base-board and having a reciprocating slide therein, a discharge-pipe arranged beneath the hopper and extending transversely across said base-board, with its ends turned downwardly, a fan adapted to expel the fertilizer from said discharge-pipe, and a suitable driving mechanism for actuating the fan and reciprocating slide.

The invention also consists in certain details of construction, which will be specifically referred to in the accompanying specification, particularly pointed out in the claims, and illustrated by the accompanying drawings, in which—

Figure 1 is a perspective view of my improved fertilizer-distributer. Fig. 2 is a top plan view of the same. Fig. 3 is a longitudinal sectional view taken on the line X X of Fig. 2. Fig. 4 is a sectional detail view taken vertically through the hopper and fan-casing.

Referring now more particularly to the accompanying drawings, A A designate longitudinally-extending beams, between which at their forward ends the ground-wheel B is journaled, said beams at their opposite ends diverging and being formed with the handle portions C and adjacent to said handle portions with the depending supporting-legs D. Pivoted to said beams adjacent to the ground-wheel are the uprights E, to which is secured the rearwardly-extending base-board F. Mounted upon said base-board adjacent to the rear end thereof is a hopper G, adapted to contain the fertilizer and provided with the outlet H. Arranged upon the base-board beneath said hopper and communicating with the outlet thereof is the transversely-extending discharge-pipe I, having its respective ends turned downwardly at opposite sides of the frame. Movable in said hopper is a slide J, which is adapted to alternately open and close the outlet thereof, and for reciprocating said slide I provide the bell-crank lever K, pivoted in the hopper and connected with the slide by a link L, a pitman M being pivotally connected to its opposite end. A shaft N is mounted in the upper ends of uprights E and provided at one end with a crank O, to which the opposite end of said pitman is pivotally connected. This shaft carries a grooved wheel P to receive a belt Q, which passes around a grooved ring R, secured upon the ground-wheel B. Thus motion is imparted to said shaft and the reciprocation of the slide effected.

Positioned upon the base-board is a casing S, having elongated portion S', which communicates with the discharge-pipe, and positioned within this casing is a fan T, which is mounted upon a shaft T', journaled in uprights U, raised from the base-board. A grooved wheel V is mounted upon this shaft and receives a belt V' from a larger belt-wheel W, carried by shaft N. Through the medium of this construction the fan is rotated and the fertilizer expelled from the respective ends of the discharge-pipe.

A lever X is intermediately pivoted to the cross-piece Y of the frame, said lever having a disk Z journaled in one end thereof and engaging the under side of the base-board. By moving the handle end of said lever forwardly the base-board is raised, as illustrated in Fig. 3, and the upper ends of the uprights E moved forwardly, thus shortening the distance between wheel P and ring R, so as to slacken belt Q. The mechanism is thus thrown out of operation, and when it is desired to render the same operative the base-board is lowered through the medium of the operating-lever.

From the above description it will be seen that I have provided a fertilizer-distributer in which the fertilizer may be distributed simultaneously to two adjacent rows and also in which the mechanism may be quickly and readily rendered operative or inoperative, the distributer being exceedingly simple in construction and effective in operation.

Having thus fully described my invention, what I claim as new, and wish to secure by Letters Patent of the United States, is—

1. In a fertilizer-distributer, the combination with a supporting-frame, of a base-board pivoted thereon, a hopper mounted upon said base-board, a reciprocating slide arranged in said hopper, a mechanism arranged upon said base-board for reciprocating said slide, a ground-wheel mounted in said supporting-frame and adapted to operate said mechanism, and means for raising and lowering said base-board to render the operating mechanism operative or inoperative, substantially as set forth.

2. In a fertilizer-distributer, the combination with a supporting-frame, of a ground-wheel journaled therein, a base-board pivoted upon said frame, a hopper mounted upon said base-board, a reciprocating slide arranged in said hopper, a shaft mounted upon said base-board, an operative connection between said shaft and slide, a belt-wheel carried by said shaft and receiving a belt from the ground-wheel, and means for raising and lowering said base-board to render the mechanism operative or inoperative, substantially as set forth.

3. In a fertilizer-distributer, the combination with a supporting-frame having a ground-wheel journaled therein, of a base-board pivoted to said frame, a hopper mounted upon said base-board, a reciprocating slide for said hopper, a crank-shaft mounted upon the base-board, a pitman connecting said slide and crank, a belt-wheel carried by said shaft and receiving a belt from the ground-wheel, and an intermediately-pivoted lever adapted to effect the raising and lowering of said base-board for the purpose of rendering the mechanism operative or inoperative, substantially as set forth.

CHARLES X SCHNEIDER.
his mark

Witnesses:
WILLIAM P. J. KEILTY,
ANSON O. SANFORD.